United States Patent [19]
Fontana et al.

[11] Patent Number: 6,167,563
[45] Date of Patent: Dec. 26, 2000

[54] METHOD AND SYSTEM FOR BUILDING COMPONENTS IN A FRAMEWORK USEFUL IN DEVELOPING INTEGRATED BUSINESS-CENTRIC APPLICATIONS

[75] Inventors: James Albert Fontana; Anthony Reginald Pitchford, both of Mission Viejo; Steven George Skinner, Trabuco Canyon; Joseph Peter Stefaniak, San Clemente, all of Calif.

[73] Assignee: Unisys Corporation, Blue Bell, Pa.

[21] Appl. No.: 09/156,026

[22] Filed: Sep. 17, 1998

[51] Int. Cl.[7] .......................................... G06F 9/44
[52] U.S. Cl. ...................... 717/1; 717/2; 717/5; 707/104; 707/103 Z; 707/103 Y; 709/312; 709/316
[58] Field of Search ................... 717/1–3, 5; 707/104, 707/200, 102, 103 R, 103 Y, 103 Z, 513; 709/316, 312

[56] References Cited

U.S. PATENT DOCUMENTS

| | | | |
|---|---|---|---|
| 5,325,533 | 6/1994 | McInerney et al. | 717/1 |
| 5,465,363 | 11/1995 | Orton et al. | 709/107 |
| 5,644,764 | 7/1997 | Johnson et al. | 707/103 |
| 5,758,160 | 5/1998 | McInerney et al. | 717/1 |
| 5,854,932 | 12/1998 | Mariani et al. | 717/9 |
| 5,860,004 | 1/1999 | Fowlow et al. | 717/1 |
| 5,920,718 | 7/1999 | Uczekaj et al. | 717/2 |
| 5,960,200 | 9/1999 | Eager et al. | 717/5 |
| 5,978,579 | 11/1999 | Buxton et al. | 717/1 |
| 6,018,627 | 1/2000 | Iyengar et al. | 717/1 |

OTHER PUBLICATIONS

Hienrich Jasper, "Active Databases for Active epositories," IEEE Proceedings. 10th International Conference on Data Engineering, 1994, pp. 375–384, Feb. 14–18, 1994.

Petro et al., "Model–Based Reuse Repositories—Concepts and Experience," IEEE Proceedings. Seventh Int3 1 Workshop on Computer–Aid Software Engineering, 1995, pp. 60–69, Jul. 10–14, 1995.

"It Community Acknowledges Importance of Select's Component Wrapping Tools to Leverage Re–Use of Existing Systems; Forte Software, Softlab, Unisys, J. Frank, Sequent Computer System and Colonial Group Endorse the Select Component Factory," Business Wire, Jan. 27, 1997, pp. 01270335 (5 pages).

*Primary Examiner*—Tariq R. Hafiz
*Assistant Examiner*—Tuan Q. Dam
*Attorney, Agent, or Firm*—J. Ronald Richebourg; Mark T. Starr; Rocco L. Adornato

[57] ABSTRACT

The method and system of the present invention solves the problems of the prior art by creating several components to detect and correct an out of date component. A component is considered out of date if one of the constituent files is newer than the components. At that point a build of the component is in order. A component dependent on another is considered out of date if the public interfaces to the component change. The interfaces of the dependent component do not necessarily have to be used by the component in question to affect the build situation. A component is considered up to date if all constituent files have a time stamp earlier than the component and no dependent components have changed their interfaces. Each of the components involved will act upon one of the situations to determine if a build should be done.

12 Claims, 11 Drawing Sheets

METHOD AND SYSTEM FOR BUILDING COMPONENTS IN A FRAMEWORK USEFUL IN DEVELOPING INTEGRATED BUSINESS-CENTRIC APPLICATIONS

CROSS REFERENCE TO RELATED APPLICATIONS

This patent document relates to the following co-pending applications, assigned to the same assignee hereof, which are incorporated herein by reference.

U.S. Ser. No. 09/154,613, entitled A METHOD AND SYSTEM FOR MONITORING AND CAPTURING ALL FILE USAGE OF A SOFTWARE TOOL;

U.S. Ser. No. 09/156,029, entitled A METHOD AND SYSTEM FOR INTERFACING TO A VARIETY OF SOFTWARE DEVELOPMENT TOOLS;

U.S. Ser. No. 09/156,028, entitled A SOFTWARE SYSTEM DEVELOPMENT FRAMEWORK; and, U.S. Ser. No. 09/156,027, entitled A METHOD AND SYSTEM FOR CONTROLLING AND TRACKING CLIENT ACCESS TO SERVER SOFTWARE.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of computer systems for developing business applications; and, in particular, it relates to a method for building or modifying software components inside a computer system and updating all dependent components automatically in a manner transparent to the user and the computer system. The present invention also relates to a method for increasing the efficiency of a computer system and integrating the correct version of all the software components.

BACKGROUND OF THE INVENTION

The software industry has seen great advances in distributed computing from both a client/server and software modeling perspective. The move towards network-centric computing, using the client/server architecture of the Internet, coupled with new software tools and component-based models, arm today's software developer with a distributed, object-oriented, infrastructure to easily access and manipulate business data.

In the early nineties, as client-server computing emerged; its more advanced software solutions introduced more intelligent links among clients and servers. Although it represents an improvement over earlier models, client-server computing still suffers from a number of drawbacks. For example, because information carried between clients and servers is usually transmitted over a proprietary protocol, each company tends to implement a closed solution, i.e. a solution which works only for the product of that particular company.

In the current scenario distributed component-based development and enabling solutions are changing the way information is discovered, built, managed and delivered. Organizations are investing in component-based technologies because they cannot afford to ignore the reductions in costs that the technology offers. As a method for delivering information to large numbers of end-users, the iterative process of building and deploying components are appealing when compared with the alternative of configuring every end-user system with application-specific client applications.

A reduction in overall costs is just one benefit. Other benefits include access to larger amounts of enterprise information for connecting the organization, delivering solutions and keeping pace with end-user demands and ever changing technology more effectively. Effective business processes require information, and the objective for the Information System (IS) organizations is to ensure that required information is available when it is needed.

Component-based technologies can embrace the entire realm of an organization's information infrastructure. Component-based technologies can take advantage of differing client platforms, diverse application environments and connectivity options.

The proposed invention relates to the field of streamlining the process of component development and maintenance in a component-based framework. It proposes a method that enhances the efficiency of the current technology and reduces its drawbacks.

SUMMARY OF THE INVENTION

The method and system of the present invention solves the problems of the prior art by creating several components to detect and correct an out of date component. A component is considered out of date if one of the constituent files is newer than the components. At that point a build of the component is in order. A component dependent on another is considered out of date if the public interfaces to the component change. The interfaces of the dependent component do not necessarily have to be used by the component in question to affect the build situation. A component is considered up to date if all constituent files have a time stamp earlier than the component and no dependent components have changed their interfaces. Each of the components involved will act upon one of the situations to determine if a build should be done.

Accordingly, it is an object of the present invention to provide support for component based development.

Another object of the present invention is to provide support for local component builds by developers, including the handling of component interface changes.

Yet another object of the present invention is to provide support for a full, unattended, system build of all elements of a system.

A feature of the present invention resides in the provision of procedures for handling both new development and maintenance for dependent components without updating the entire system, thereby making the system more efficient at development time.

Another feature of the present invention is in the capability of allowing developers to control the automated component development process thereby creating a component-based technology that caters to their system needs while being open in nature, i.e. being adaptable to any distributed component based system.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

A normal object program stores objects in a computer system's memory. When the program terminates, the memory used by those objects is freed and reused by other programs, making the objects that the program stored transient. An object database stores objects in a non-volatile memory, such as a computer disk. Since the information on a computer disk remains in existence, even when the computer is turned off, an object database provides the ability to persistently store objects. An object program that uses an object database thus has the option of storing objects transiently or persistently.

The term protocol as used herein refers to a set of formal rules describing how to transmit data, especially across a network. Low-level protocols define the electrical and physical standards to be observed, bit- and byte-ordering and the transmission and error detection as well as correction of the bit stream. High-level protocols deal with message formatting, including the syntax of messages, the terminal to computer dialogue, character sets, sequencing of messages, etc.

Figure 1:
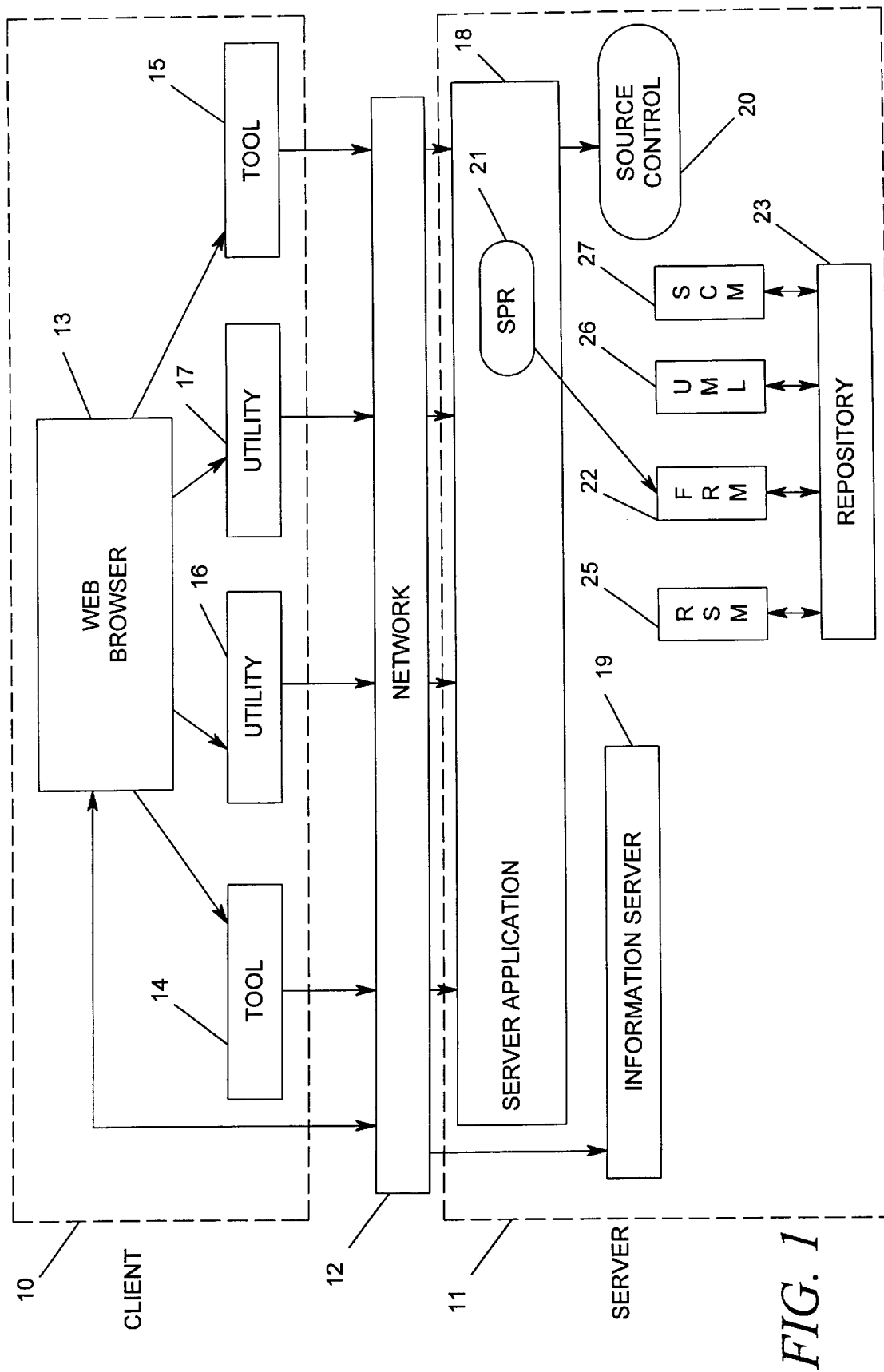
FIG. 1 is a block diagram of a computer system framework which may employ the method and system of the present invention.

Referring now to the drawings, and FIG. 1 in particular, a block diagram of a computer system framework which may employ the method and system of the present invention is shown. In accordance with an exemplary embodiment, a client 10 is coupled to a server 11 by means of a network 12. The network 12 may comprise any conventional network (e.g., TCP/IP), or the Internet. The client 10 includes a web browser 13, which may comprise any readily available web browser. The web browser 13 is coupled to tools 14 and 15 and utilities 16 and 17. Tools 14 and 15 may comprise, for example, Visual Basic or Visual C++, both of which are available from Microsoft Corporation of Redmond, Wash. The utilities 16 and 17 may comprise, for example, a wrapper tool useful in developing interfaces for a component or any third party developed software that helps in the component build process. The tools 14 and 15, and utilities 16 and 17 are linked to the network 12 by means of industry standard communication protocols. It is pointed out that the web browser 13 may be directly coupled to the network 12 by means of a web protocol.

Within the server 11 is a server application 18, which may comprise a Microsoft transaction server ("MTS") available from Microsoft Corporation of Redmond, Wash. The network 12 is coupled to the server application 18, and to an information server 19. The information server 19 may comprise the Internet Information Server, which is available from Microsoft Corporation, of Redmond, Wash. A source control 20 is linked to the server application 18 and a shared persistent resource ("SPR") 21 is deployed within the server application 18 for linking to a File Reference Module ("FRM") 22, which is coupled to a repository 23. The source control 20 may comprise Visual Source Safe, available from Microsoft Corporation of Redmond, Wash. The repository 23 may also be coupled to a repository controlling model like the Repository Services Model ("RSM") 25. The repository 23 also has access to a component modeling tool like the Unified Modeling Language ("UML") 26, and a component manager like Select Component Manager ("SCM") 27, available from Select Software of Irvine, Calif.

The repository 23 further includes tools for cataloging, browsing, and managing components that make up an application. Methods to support these services are disclosed in several patents and patent applications assigned to the assignee of this application, including U.S. Pat. No. 5,671, 398 for METHOD FOR COLLAPSING A VERSION TREE WHICH DEPICTS A HISTORY OF SYSTEM DATA AND PROCESSES FOR AN ENTERPRISE; U.S. Pat. No. 5,644, 764 for METHOD FOR SUPPORTING OBJECT MODELING IN A REPOSITORY; U.S. Pat. No. 5,581,755 for METHOD FOR MAINTAINING A HISTORY OF SYSTEM DATA AND PROCESSES FOR AN ENTERPRISE; U.S. Pat. No. 5,557,793 for IN AN OBJECT ORIENTED REPOSITORY, A METHOD FOR TREATING A GROUP OF OBJECTS AS A SINGLE OBJECT DURING EXECUTION OF AN OPERATION; U.S. Pat. No. 5,889,992, for A METHOD FOR MAPPING TYPES IN A MODEL IN A OBJECT-ORIENTED REPOSITORY TO LANGUAGE CONSTRUCTS FOR A C BINDING FOR THE REPOSI- TORY; U.S. Pat. No. 5,721,925, for METHOD FOR GENERICALLY INVOKING OPERATIONS IN AN OBJECT ORIENTED REPOSITORY; U.S. Pat. No. 5,889,992, for A METHOD FOR GENERATING OLE AUTOMATION AND IDL INTERFACES FROM METADATA INFORMATION; U.S. Pat. No. 5,765,039 for A METHOD FOR PROVIDING OBJECT DATABASE INDEPENDENCE IN A PROGRAM WRITTEN USING THE C++ PROGRAMMING LANGUAGE; U.S. Pat. No. 5,758,348, for A METHOD FOR GENERICALLY MANIPULATING PROPERTIES OF OBJECTS IN AN OBJECT ORIENTED REPOSITORY; U.S. Pat. No. 5,701,472, for A METHOD FOR LOCATING A VERSIONED OBJECT WITHIN A VERSION TREE DEPICTING A HISTORY OF SYSTEM DATA AND PROCESSES FOR AN ENTERPRISE; U.S. Pat. No. 6,105,073, for A METHOD FOR PACKING/UNPACKING C OPERATIONS TO/FROM RPC COMPATIBLE FORMAT USING THE RPC PROTOCOL TO OPERATE REMOTELY WITH AN OBJECT-ORIENTED REPOSITORY, each of which are hereby incorporated by reference as if set forth in full herein.

Figure 2:
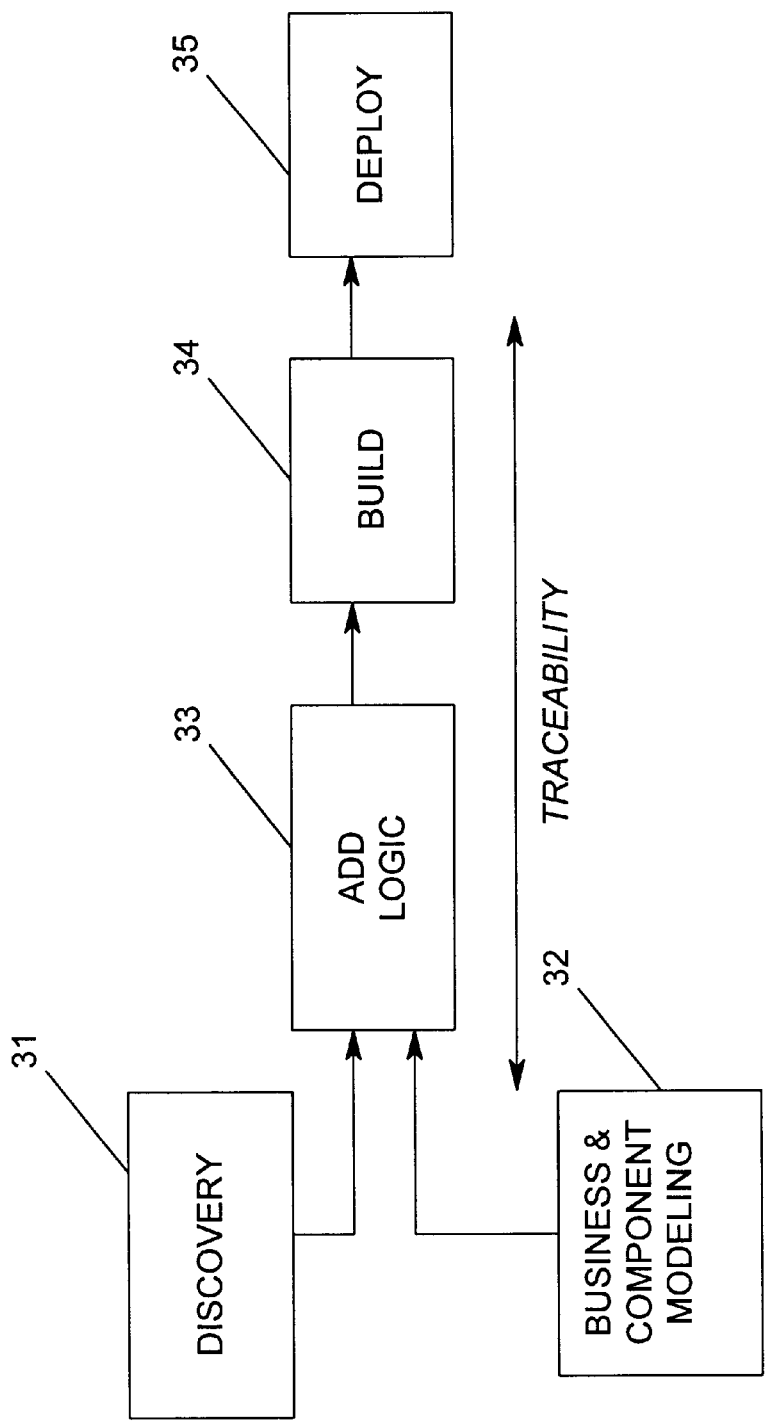
FIG. 2 is a software module block diagram of the method and system of a theoretical model of the present invention.

Referring now to FIG. 2, a software module block diagram of a theoretical model of the method and system of the present invention is shown. The method and system of the present invention generally relates to a typical component development process, which includes discovery (discovery module 31), modeling (business & component modeling module 32), logic addition (add logic module 33), building (build module 34) and deployment (deploy module 35). The invention may also support several value-added component development process elements such as flexibility, traceability and iterative development. For more elaboration of these process elements reference may be had to the above-cited co-pending patent application entitled A SOFTWARE SYSTEM DEVELOPMENT FRAMEWORK. The invention utilizes the services of a repository (e.g., the repository 23) to keep all tools and processes.

The discovery module 31 functions to locate and catalog enterprise source information. The business & component modeling module 32 functions to define and present visually the interaction of business processes. The add logic module 33 functions to further define the behavior of the business object. The build module 34 functions to compile or wrap source code information. The deploy module 35 functions to publish the components to the environment.

Modeling the world as objects and then implementing them in an object-oriented system is the basis of object-oriented technology. Corporations are just beginning to apply the concepts of object technology to the business itself. Anything that is related to the finances, products, or customers of an enterprise can be a business object and work as part of a cooperative business object system. Business objects represent things, processes or events that are meaningful to the conduct of a business. Business objects make sense to business people. More specifically, a business object is a representation of an active thing in the business domain, including at least its business name and definition, attributes, behavior, relationships, rules, policies and constraints. Typical examples of business objects are an employee, a product, an invoice or payment receipt. Business objects do not have to be written in an object-oriented language.

An object represents the business object abstraction, which models the real world in the information system. Each such object in the information model is a component of that information model and must be supported by a technology infrastructure. The discovery phase is characterized by the capturing of source information. A unit of source information is characterized as containing enough information to allow it to be effectively modeled. Source information can include the screen input and output of legacy transactions, documents, data base records, etc. There are various third party supplied tools that provide for the capturing of source information. The component development process can encapsulate the discovery tools themselves or provide services to import the source information, or specifications, into the various repository models.

The build phase takes the specifications and creates the implementation. That is, source files or source information is compiled or wrapped to create a component that will be used in the runtime system. The component development process of the present invention is not tied to any one particular compiler or wrapping tool. Defining a particular build tool is the responsibility of the process administrator. Typically, the administrator will use several tools depending on the domain for which the implementations are being deployed.

The deployment phase is characterized as the deployment of a component implementation. Deployment can be either a manual or programmatic process. The component development process provides a number of utilities that permit the programmatic deployment of components.

Figure 3:
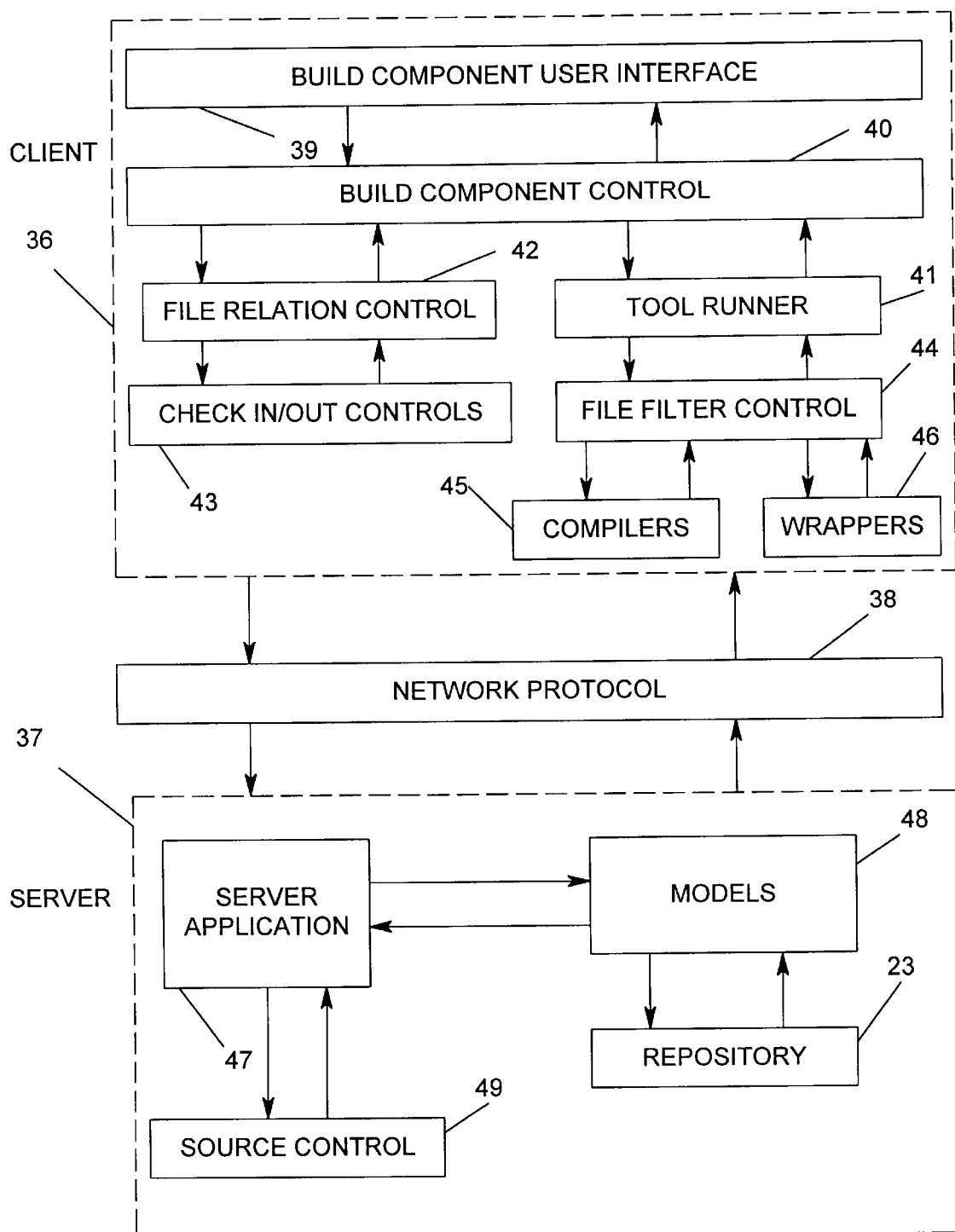
FIG. 3 is a block diagram of a particular embodiment of the method and system of the present invention.

Referring now to FIG. 3, a block diagram of a particular embodiment of the method and system of the present invention is shown. Various modules involved in a typical component development and building process are illustrated. For ease of understanding the FIG. is divided into two parts, the client part 36 and the server part 37. The client and the server communicate with each other over a network 38, which can be either a TCP/IP connection or the Internet. The client 36 includes a build component user interface 39, which is a graphical user interface used to handle user requests and function manipulation. The build component user interface 39 communicates with a build component control 40, which comprises all of the client side applications needed to invoke the component build process of the present invention and associated functions, such as invoking a tool runner control 41. For more explanation about the tool runner control 41 reference is made to the above-cited patent application Ser. No. 09/156,029 entitled A METHOD AND SYSTEM FOR INTERFACING TO A VARIETY OF SOFTWARE DEVELOPMENT TOOLS. For updating dependencies and identifying constituent components the build component control 40 uses a file relation control 42. The file relation control 42 retrieves and replaces files, which are components from the repository 23 and a source control in the server 37 through a check in/out controls 43. The tool runner control 41 communicates with the build component control 40 to invoke and run a user selected tool employed for the build and development process. The tool runner 41 also communicates with a file filter control 44 to record and log information regarding the dependent components at development time. The file filter control 44 also supplies input to a compiler tool 45 or a wrapper tool 46 as selected by the user to build and develop components. An example of a compiler tool may be Visual Basic. An example of a wrapper tool may be COMTI Component Builder available from Microsoft Corporation of Redmond, Wash.

Within the server 37 is a server application 47 which can be a transaction processing server application like the Microsoft Transaction Server. The server 37 also includes software models 48 that may comprise a business model or a domain model, which are made up of components. It is through these models that the components develop dependencies on one another. The models are accessed from both the repository 23 and the server application 47. The server application 47 also communicates with a source control program 49 to obtain source code files for the components and update them. An example of a source control program would be Visual Source Safe available from Microsoft Corporation of Redmond, Wash.

Referring now to FIGS. 4A through 4G, a flow chart illustrates the method of the present invention in greater detail. Beginning with FIG. 4A, the process starts with a start bubble 55 followed by a step of going to the build component user interface (block 56). Next, a domain for building components is selected (block 57). The components to be built are then selected (block 58), and the tool to be used to build the components is selected (block 59). An inquiry is made as to what tool type is to be used (diamond 60). If the type of tool to be used is a wrapper tool (block 61), then the process illustration continues in FIG. 4B as denoted by a connector A. On the other hand, if the tool to be used is a compiler tool (block 62), then the process illustration continues in FIG. 4E as denoted by a connector B.

Figure 4A:
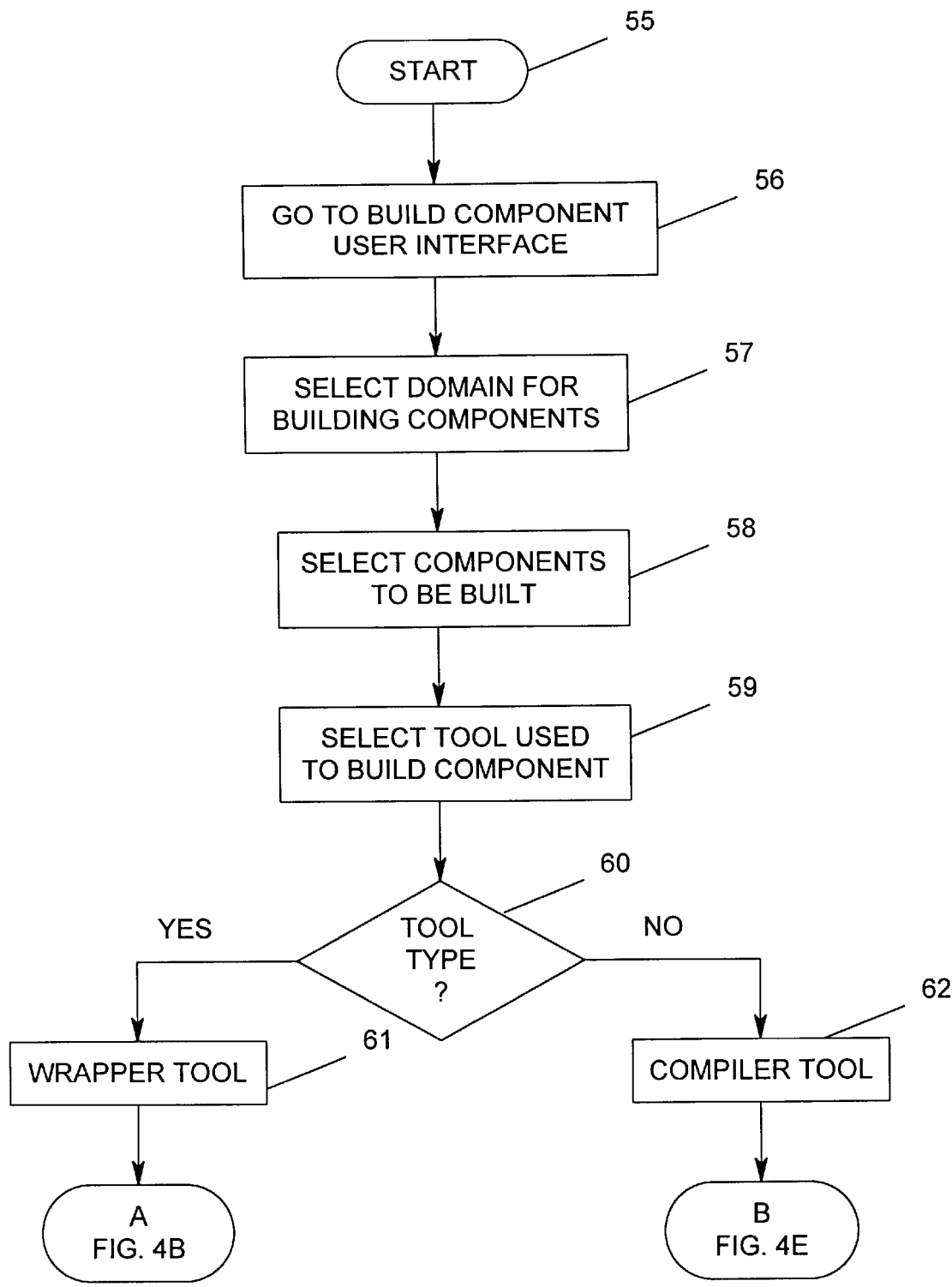
FIGS. 4A through 4H combined form a flow chart of the disclosed embodiment of the present invention.
Figure 4B:
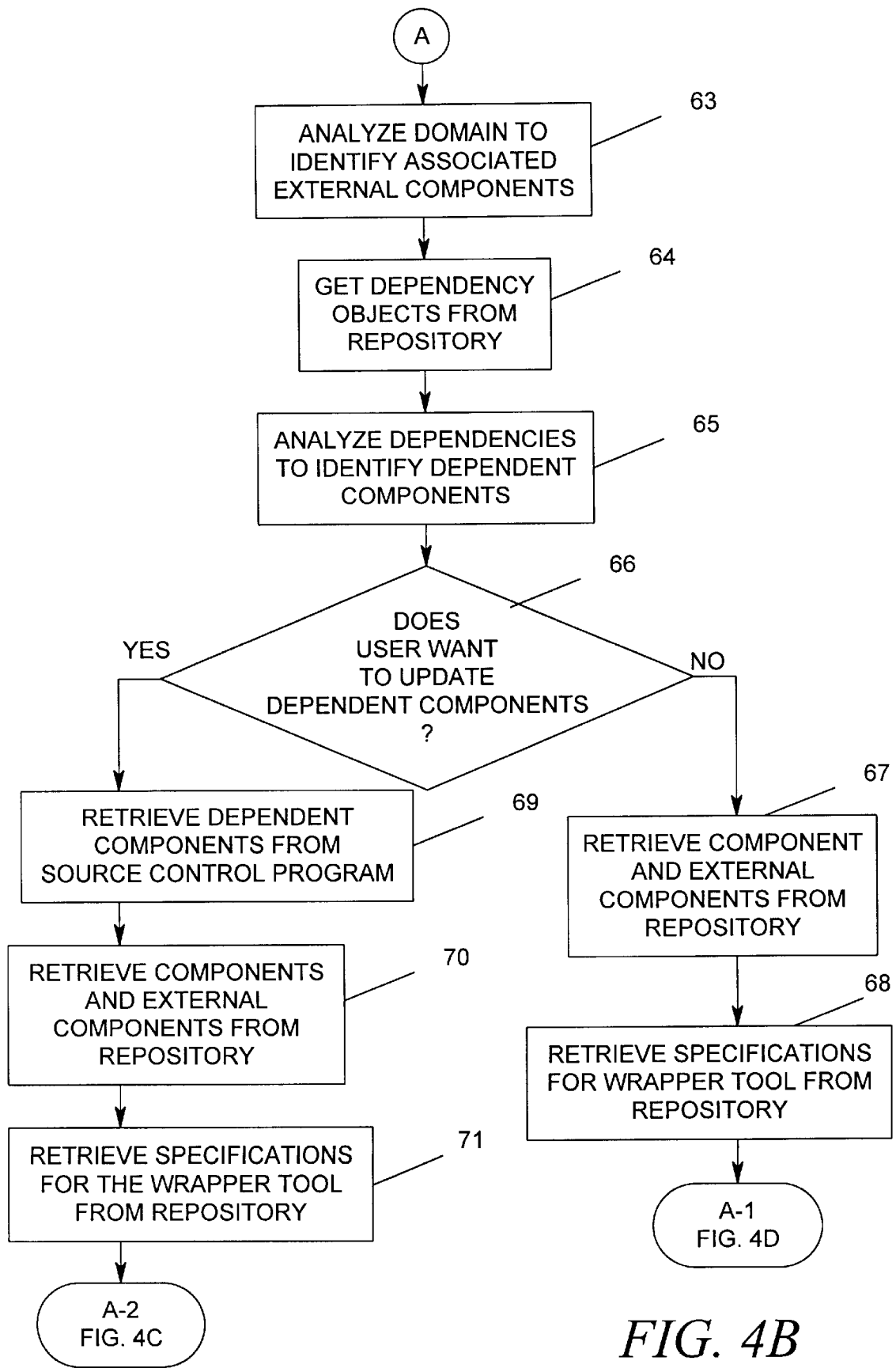

Referring now to FIG. 4B at the connector A, the domain is analyzed to identify the associated external components (block 63). Next, the dependency objects are obtained from the repository (block 64). The dependencies are then analyzed to identify dependent components (block 65). After this, an inquiry is made as to whether or not the user wants to update dependent components (diamond 66). If the answer to this inquiry is no, then the components and external components are retrieved from the repository (block 67). Next, the specifications for the wrapper tool are retrieved from the repository (block 68). This part of the process illustration continues in FIG. 4D as denoted by a connector A-1.

On the other hand, if the user does want to update dependent components (yes leg of the diamond 66), then the dependent components are retrieved from the source control program (block 69). Next, the components and external components are retrieved from the repository (block 70). After this, the specifications for the wrapper tool are retrieved from the repository (block 71). This part of the process illustration continues in FIG. 4C as denoted by a connector A-2.

Figure 4C:
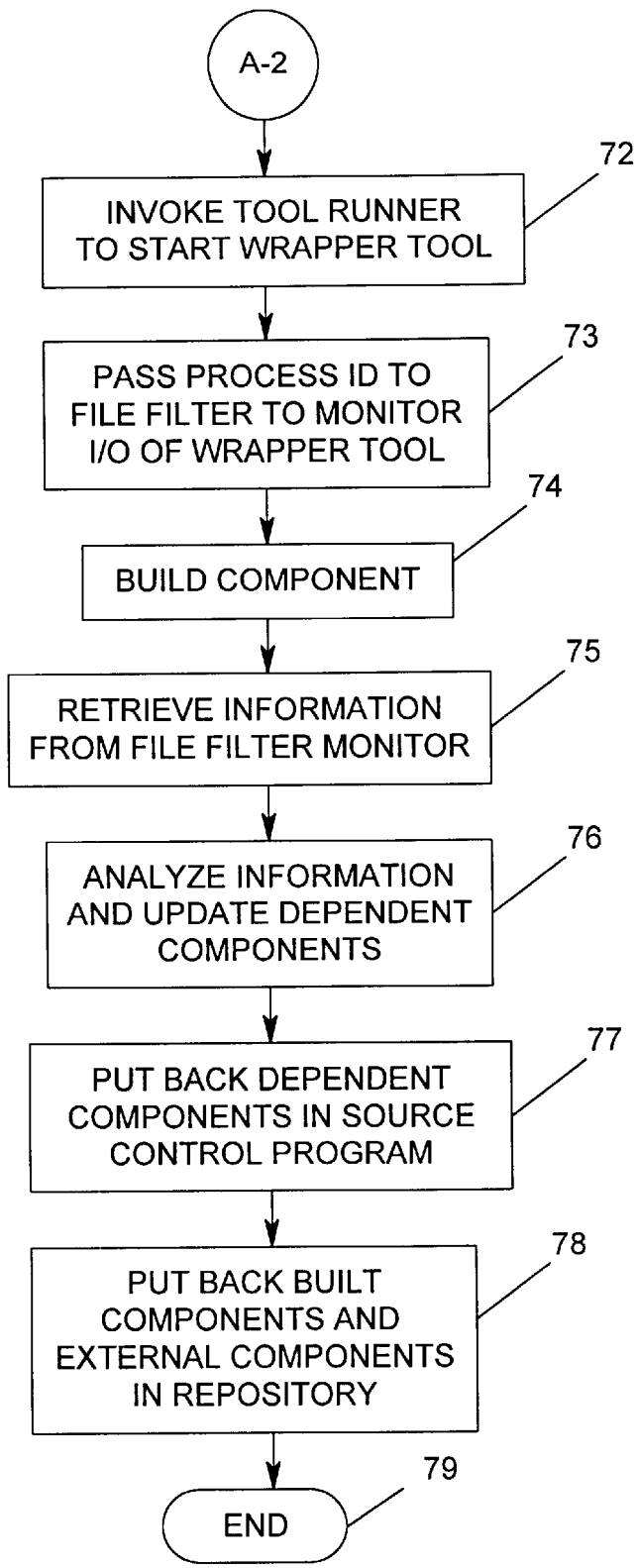

Referring now to FIG. 4C at the connector A-2, a tool runner is invoked to start the wrapper tool (block 72). Next, a process ID is passed to a file filter to monitor I/O operations of the wrapper tool (block 73). The component is then built (block 74). Information regarding the I/O operations of the wrapper tool is retrieved from the from the file filter monitor (block 75). This information is analyzed for the calls made by the wrapper tool and the types of responses received from the calls, and the dependent components are accordingly updated (block 76). The dependent components are then put back in the source control program (block 77). After this, the components built in block 74 and the external components are put back into the repository (block 78) and the process ends (bubble 79).

Figure 4D:
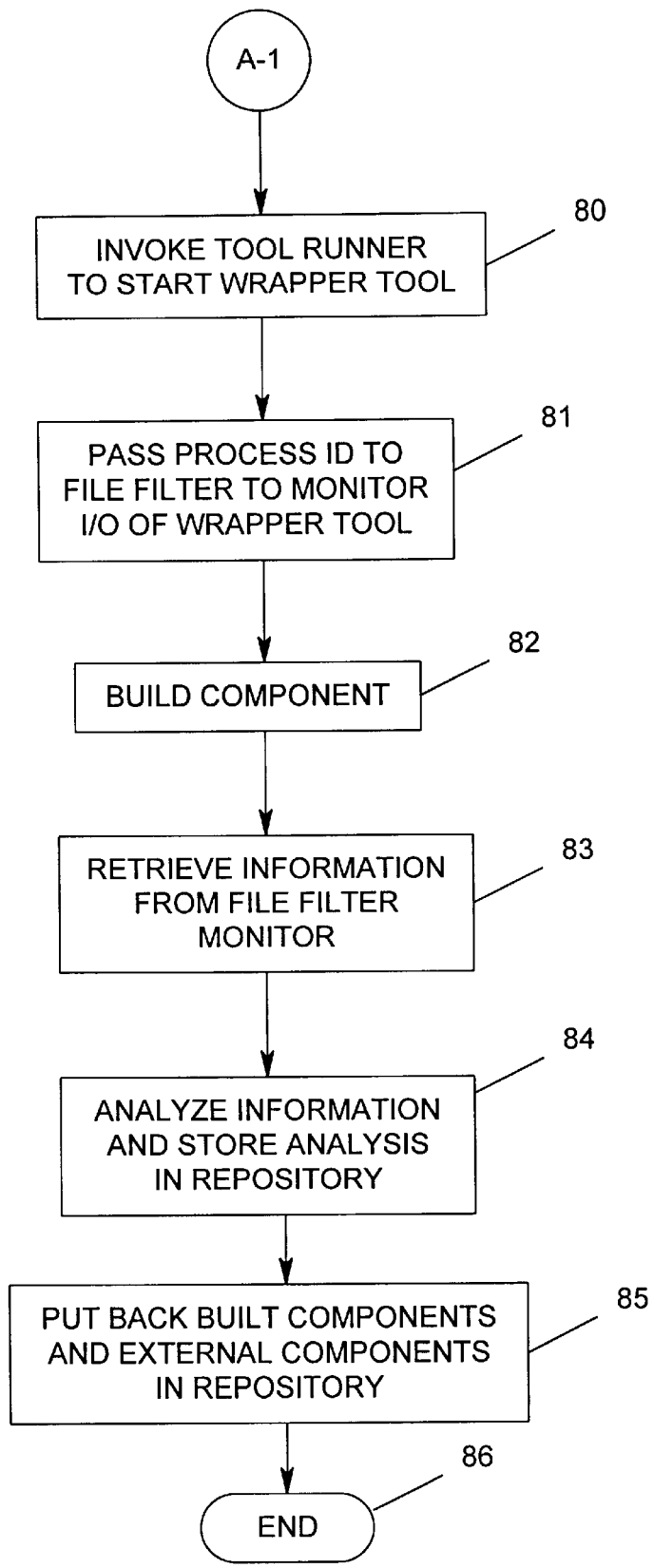

Referring now to FIG. 4D at the connector A-1, a tool runner is invoked to start the wrapper tool (block 80). Next, a process ID is passed to the file filter to monitor I/O operations of the wrapper tool (block 81). After this, the component is built (block 82). Information regarding the I/O operations is retrieved from the file filter monitor (block 83) and analyzed and stored in the repository (block 84). The built components and the external components are put back into the repository (block 85) and the process ends (bubble 86).

Figure 4E:
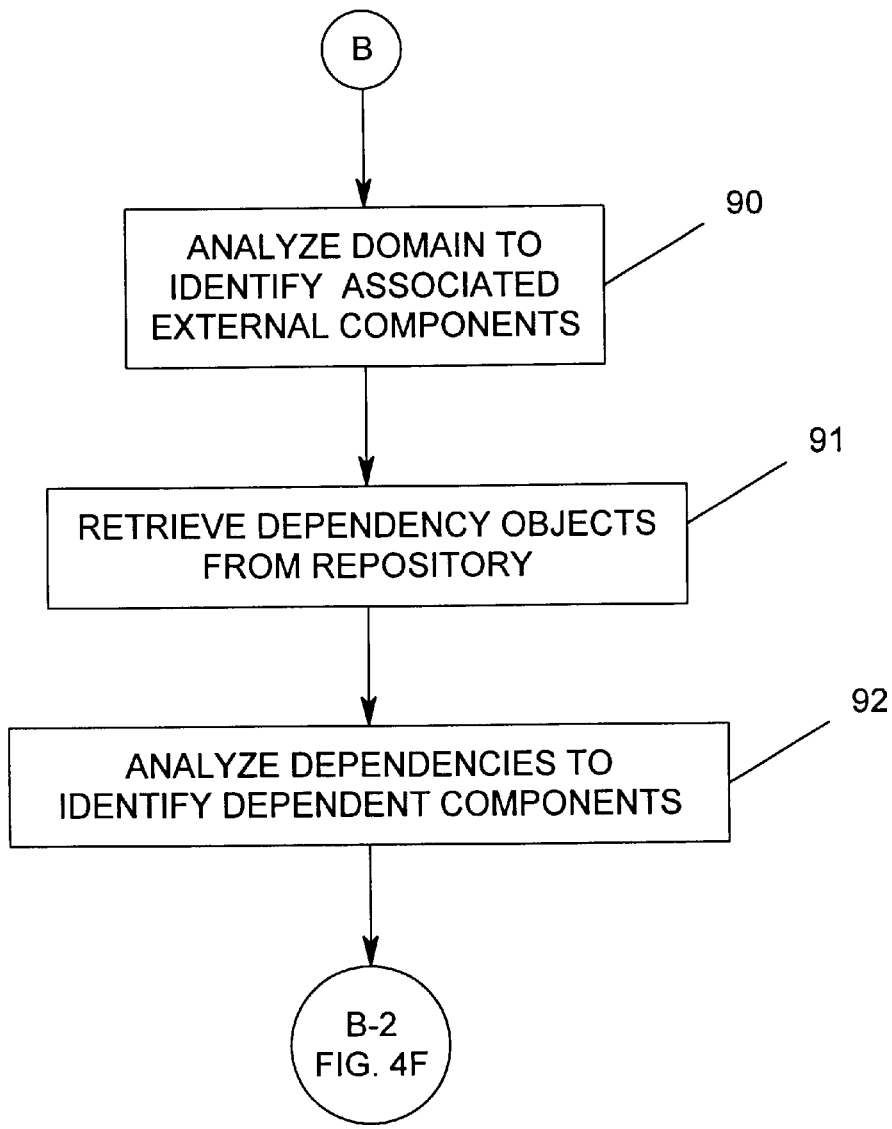

Referring now to FIG. 4E at the connector B, the domain is analyzed to identify associated external components (block 90). Next, the dependency objects are retrieved from the repository (block 91). The dependencies are then analyzed to identify dependent components (block 92). The process illustration continues on FIG. 4F at a connector B-2.

Figure 4F:
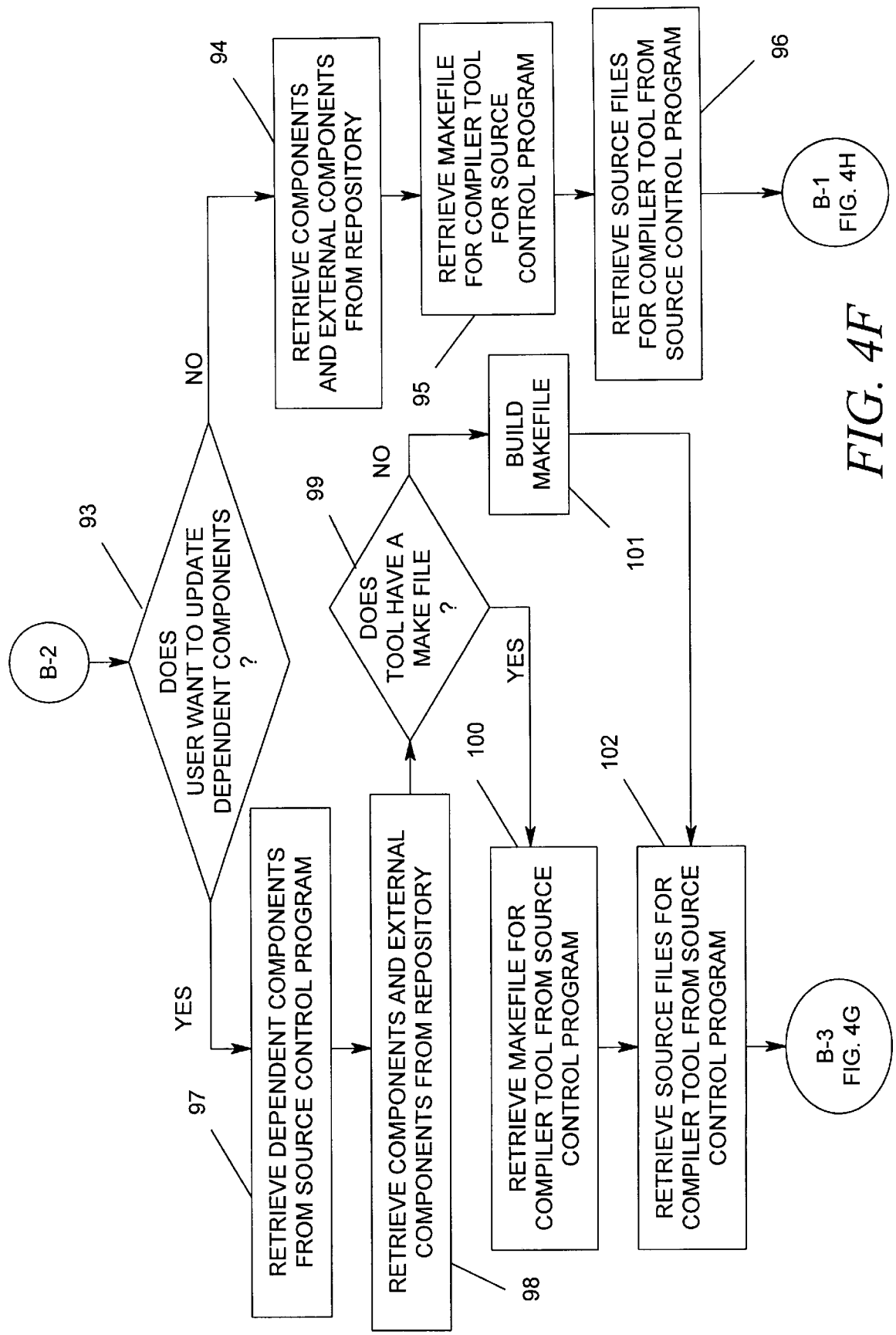

Referring now to FIG. 4F at the connector B-2, an inquiry is made as to whether or not a user wants to update the dependent components (diamond 93). If the answer to this inquiry is no, then the components and external components are retrieved from the repository (block 94). Next, a makefile for the compiler tool is retrieved from the source control program (block 95). After this, the source files for the compiler tool are retrieved from the source control program (block 96). The process illustration continues in FIG. 4H, as denoted by a connector B-1.

On the other hand, if the user does want to update the dependent components (yes leg of the diamond 93), then the dependent components are retrieved from the source control program (block 97). Next, the components and external components are retrieved from the repository (block 98). An inquiry is made as to whether or not the tool has a makefile (diamond 99). If the answer to this inquiry is yes the makefile for the compiler tool is retrieved from the source control program (block 100). On the other hand, if the tool does not have a makefile, then a make file is built (block 101). Upon completion of the step depicted by the block 100 or 101, the source files for the compiler tool are retrieved from the source control program (block 102). At this juncture of the description it is pointed out that a similar decision inquiry may be made between the process steps depicted by the blocks 94 and 95. In other words, after the external components have been retrieved from the repository (block 94), and the compiler tool does not have a makefile, then one will be built. The process illustration continues in FIG. 4G, as denoted by a connector B-3.

Figure 4G:
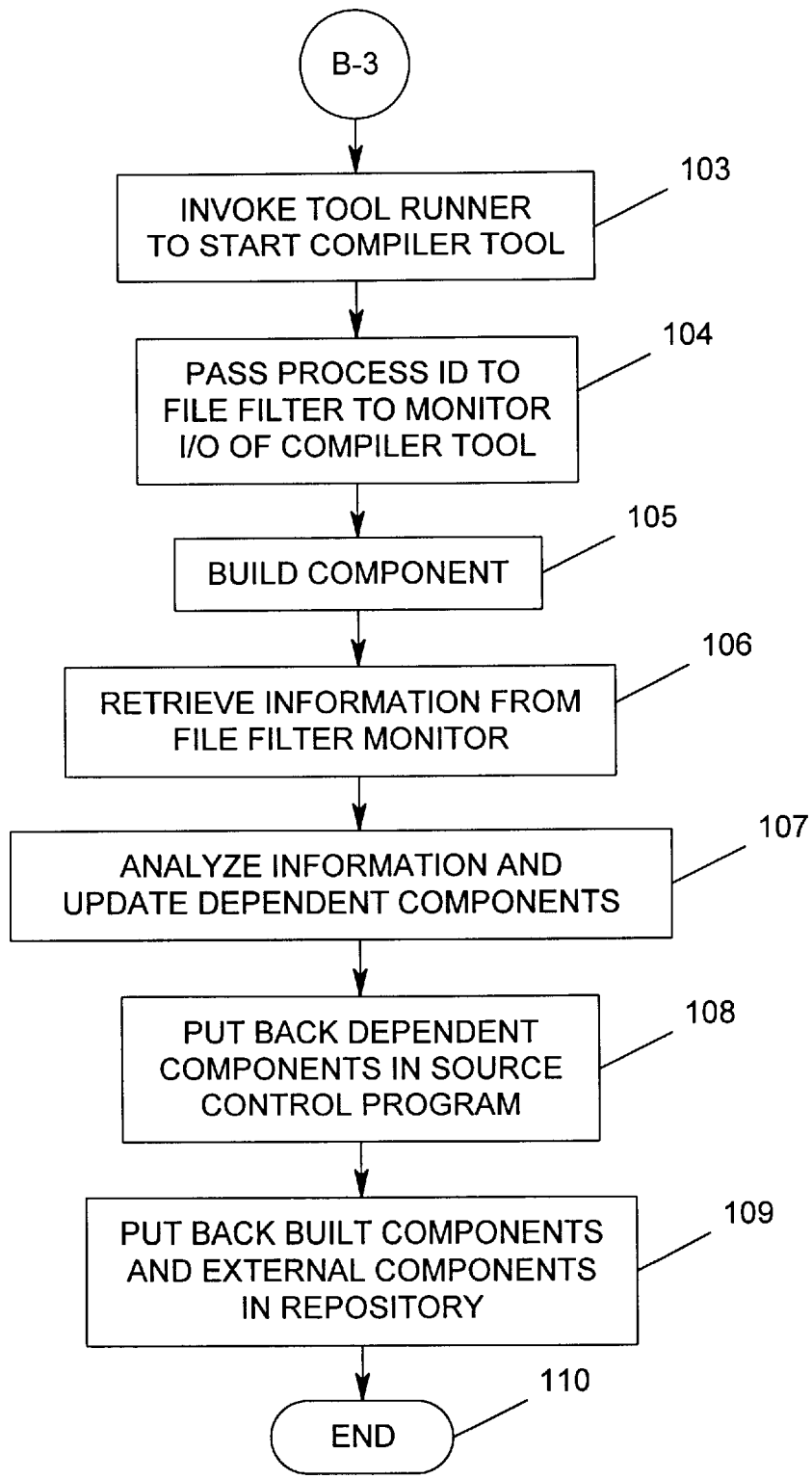

Referring now to FIG. 4G at the connector B-3, a tool runner is invoked to start the compiler tool (block 103). Next, a process ID is passed to the file filter to monitor I/O operations of the compiler tool (block 104). After this, the component is built (block 105). Information regarding I/O operations of the tool is retrieved from the file filter monitor (block 106). Next, this information is analyzed and the dependent components are updated accordingly (block 107). The dependent components are then put back into the source control program (block 108). The built components and external components are put back into the repository (block 109) and the process ends (bubble 110).

Figure 4H:
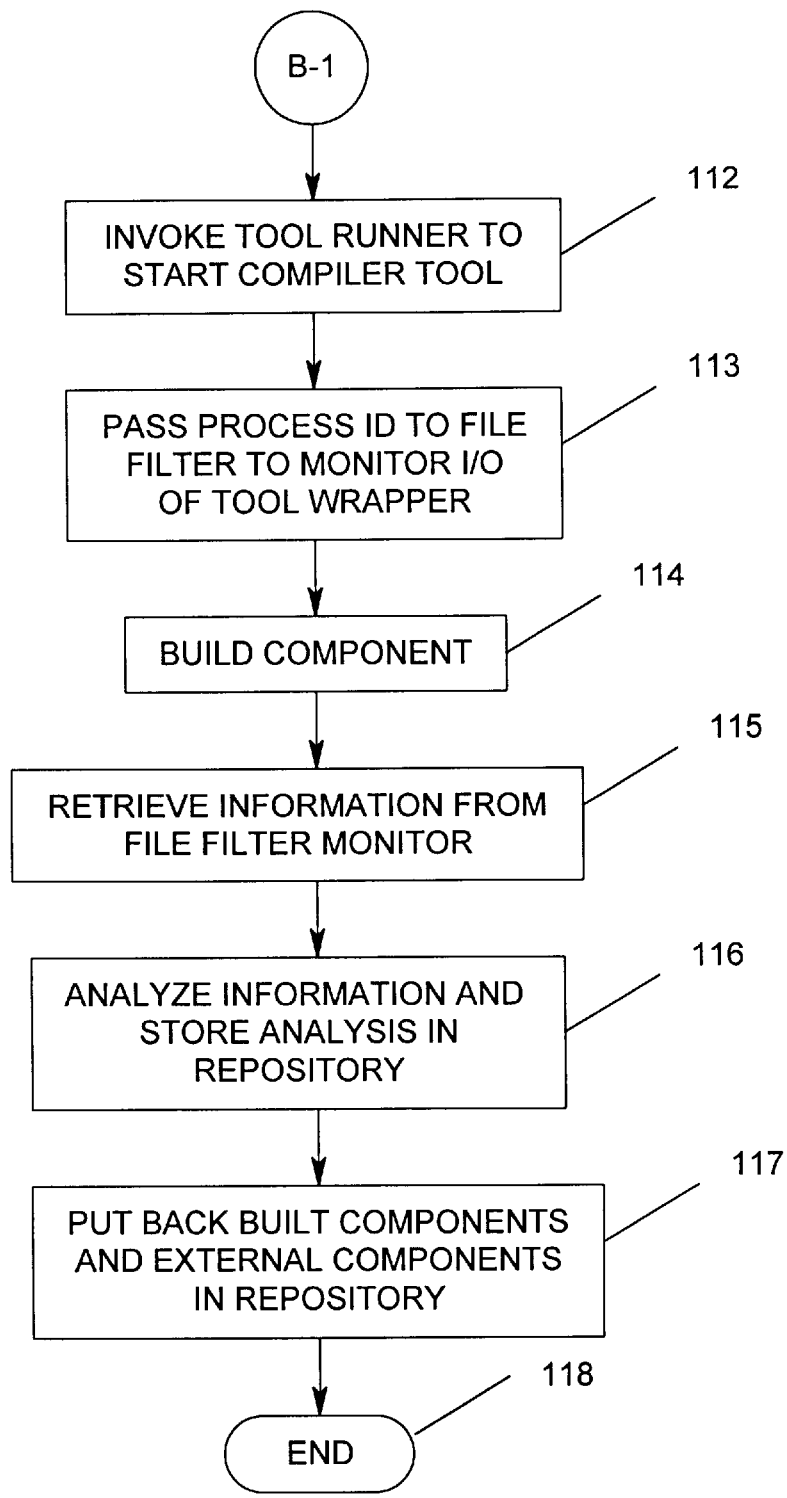

Referring now to FIG. 4H at the connector B-1, a tool runner is invoked to start the compiler tool (block 112). Next, a process ID is passed to the file filter to monitor I/O operations of the tool wrapper (block 113). After this, the component is built (block 114). Information regarding the I/O operations is retrieved from the file filter monitor (block 115). This information is then analyzed and the analysis is stored in the repository (block 116). The built components and the external components are put back into the repository (block 117) and the process ends (bubble 118).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a software development framework having a storage device, a method for building components to develop applications, said method including the steps of:
  a. with the use of a dependency object stored in said storage device, identifying dependencies between each of said components and corresponding ones of separate components in a source control program;
  b. creating a list of dependencies between each of said components and said separate components by analyzing dependencies in order to identify dependent components;
  c. retrieving dependent components from said application in order to identify external components from a respository needed for developing said application;
  d. retrieving each of said components and said external components identified in the preceding step from said source control program;
  e. retrieving a makefile for a compiler tool from said source control program;
  f. retrieving source files for said compiler tool from said source control program;
  g. invoking said compiler tool through a tool runner control;
  h. developing said application through each of said components and said external components; and,
  i. returning each of said components and said external components to said source control program.

2. The method as in claim 1 further including the step of passing a process ID for identifying said tool runner control operation to a file filter software.

3. The method as in claim 1 further including the step of updating dependencies of said separate components through each of said components and external components.

4. The method as in claim 1 further including the step of determining if said compiler tool has a makefile.

5. The method as in claim 4 where said compiler tool does not have a makefile, further including the step of building a makefile for said compiler tool.

6. In a software development framework having a storage device, a method for wrapping components for use in building applications, said method comprising the steps of:
  a. using a dependency object in said storage device, identifying dependencies between a first one of said components and a separate component inside a source control program;
  b. creating a list of dependencies between said first one of said components and said separate component by analyzing dependencies in order to identify dependent components;
  c. retrieving dependent components from said application to identify an external component from a repository needed for building said application;
  d. retrieving said first one of said components and said external component from said source control program;
  e. retrieving specifications for a wrapper tool from said source control program;
  f. invoking said wrapper tool through a tool runner control;
  g. passing a process ID for said tool runner control to a file filter software;
  h. developing said application through said first one of said components and said external component;
  i. updating said separate component through said first one of said components and said external component; and,
  j. returning said first one of said components and said external component to said source control program.

7. A program storage medium readable by a machine having a storage device, said medium tangibly embodying a program of instructions executable by the machine to perform method steps for building components to develop applications in a framework, said method including the steps of:
  a. with the use of a dependency object stored in said storage device, identifying dependencies between each of said components and corresponding ones of separate components in a source control program;
  b. creating a list of dependencies between each of said components and said separate components;
  c. parsing said application to identify external components from a repository needed for developing said application;
  d. retrieving each of said components and said external components identified in the preceding step from said source control program;
  e. retrieving a makefile for a compiler tool from said source control program;
  f. retrieving source files for said compiler tool from said source control program;
  g. invoking said compiler tool through a tool runner control;
  h. developing said application through each of said components and said external components; and,
  i. returning each of said components and said external components to said source control program.

8. The medium as in claim 7 wherein said method further includes the step of passing a process ID for identifying said tool runner control operation to a file filter software.

9. The medium as in claim 7 wherein said method further includes the step of updating dependencies of said separate components through each of said components and said external components.

10. The medium as in claim 7 wherein said method further includes the step of determining if said compiler tool has a makefile.

11. The medium as in claim 10 where said compiler tool does not have a makefile, further including the step of building a makefile for said compiler tool.

12. A program storage medium readable by a machine having a storage device, said medium tangibly embodying a program of instructions executable by the machine to perform method steps for wrapping components for use in building applications, said method comprising the steps of:

a. using a dependency object in said storage device, identifying dependencies between a first one of said components and a separate component inside a source control program;

b. creating a list of dependencies between said first one of said components and said separate component;

c. parsing said application to identify an external component from a respository needed for building said application;

d. retrieving said first one of said components and said external component from said source control program;

e. retrieving specifications for a wrapper tool from said source control program;

f. invoking said wrapper tool through a tool runner control;

g. passing a process ID for said tool runner control to a file filter software;

h. developing said application through said first one of said components and said external component;

i. updating said separate component through said first one of said components and said external component; and, j. returning said first one of said components and said external component to said source control program.

* * * * *